United States Patent

Chang

(10) Patent No.: US 8,085,650 B2
(45) Date of Patent: Dec. 27, 2011

(54) OPTICAL ENCODER HAVING OPTICAL ENCODING DISC WITH LIGHT CONVERGING PORTIONS AND LIGHT DIVERGING PORTIONS

(75) Inventor: Jen-Tsorng Chang, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/069,398

(22) Filed: Mar. 23, 2011

(65) Prior Publication Data

US 2011/0170399 A1  Jul. 14, 2011

Related U.S. Application Data

(62) Division of application No. 12/192,370, filed on Aug. 15, 2008, now Pat. No. 7,969,856.

(30) Foreign Application Priority Data

Feb. 22, 2008  (CN) .......................... 2008 1 0300385

(51) Int. Cl.
  *G11B 7/24*  (2006.01)
(52) U.S. Cl. .................................... 369/275.4
(58) Field of Classification Search .............. 369/275.4, 369/275.3, 275.2, 275.1; 428/64.1, 64.4; 430/321, 320, 270.11, 270.13
See application file for complete search history.

(56) References Cited

U.S. PATENT DOCUMENTS

| | | | | | |
|---|---|---|---|---|---|
| 5,754,522 | A  * | 5/1998  | Kobayashi et al. | ........ | 369/275.3 |
| 5,933,411 | A  * | 8/1999  | Inui et al. | ................. | 369/275.4 |
| 5,940,364 | A  * | 8/1999  | Ogata et al. | ............... | 369/275.4 |
| 6,069,870 | A  * | 5/2000  | Maeda et al. | .............. | 369/275.4 |
| 6,115,353 | A  * | 9/2000  | Horie et al. | ............... | 369/275.4 |
| 6,122,233 | A  * | 9/2000  | Iketani et al. | ............. | 369/44.26 |
| 6,233,219 | B1 * | 5/2001  | Hori et al. | ................. | 369/275.4 |
| 6,292,458 | B1 * | 9/2001  | Eguchi et al. | .............. | 369/275.3 |
| 6,320,839 | B1 * | 11/2001 | Tobita et al. | .............. | 369/275.4 |
| 6,335,070 | B1 * | 1/2002  | Tomita | ....................... | 428/64.1 |
| 6,549,495 | B1 * | 4/2003  | Spruit et al. | .............. | 369/47.19 |
| 6,587,417 | B2 * | 7/2003  | Okamoto et al. | ......... | 369/59.22 |
| 6,999,404 | B2 * | 2/2006  | Furumiya et al. | ......... | 369/275.4 |
| 7,038,998 | B2 * | 5/2006  | Fujita et al. | ............... | 369/275.4 |
| 7,054,245 | B2 * | 5/2006  | Spruit et al. | .............. | 369/47.19 |
| 7,113,467 | B2 * | 9/2006  | Schep | ....................... | 369/53.34 |

* cited by examiner

*Primary Examiner* — Tan X Dinh
(74) *Attorney, Agent, or Firm* — Altis Law Group, Inc.

(57) ABSTRACT

An optical encoder includes an optical encoding disc, a light source module, a motor, and an optical detection system. The optical encoding disc includes a plurality of concentric annular tracks. Each track includes a plurality of coding units. Each coding unit includes a light converging portion and a light diverging portion. The light converging portions and the light diverging portions are arranged alternately along a circumferential direction of the optical encoding disc. The motor is configured for driving the optical encoding disc to rotate. The optical detection system includes a plurality of photo-detectors arranged in a line parallel to a radius of the optical encoding disc. Each photo-detector is corresponding to each track of the optical encoding disc respectively. Each photo-detector is configured for receiving the light beam transmitted through the corresponding track, and generating a voltage according to an intensity of the received light beam.

9 Claims, 4 Drawing Sheets

OPTICAL ENCODER HAVING OPTICAL ENCODING DISC WITH LIGHT CONVERGING PORTIONS AND LIGHT DIVERGING PORTIONS

CROSS REFERENCE

This application is a divisional application of patent application Ser. No. 12/192,370 filed on Aug. 15, 2008 from which it claims the benefit of priority under 35 U.S.C. 120. The patent application Ser. No. 12/192,370 in turn claims the benefit of priority under 35 U.S.C. 119 from Chinese Patent Application 200810300385.8, filed on Feb. 22, 2008.

BACKGROUND

1. Technical Field

The present invention relates to an optical encoder having an optical encoding disc.

2. Description of Related Art

Optical encoders use optical signal to detect mechanical positions and motions in various types of systems. The mechanical positions and motions detected by optical encoders can be related to linear or rotational displacements of moveable components, such as shafts of motors.

A conventional optical encoder typically includes a light source module, an optical encoding disc, and a plurality of photo-detectors. The optical encoding disc made of a glass substrate includes a plurality of concentric annular tracks. Each track has a different pattern so that the optical encoding disc has a different combination of patterns with respect to different angular positions of the optical encoding disc.

The pattern of each track is generally constituted by a plurality of light pervious portions and a plurality of light blocking portions. The light blocking portions are formed by coating a light blocking film on the glass substrate. Portions of the glass substrate free of the light blocking film function as the light pervious portions. However, it is relatively expensive to make the optical encoding disc by film coating. Accordingly, the cost of the optical encoding disc and the optical encoder is relatively high.

Therefore, a new optical encoding disc and a new encoder having the same are desired to overcome the above mentioned problems.

SUMMARY

An optical encoder includes an optical encoding disc, a light source module, a motor, and an optical detection system. The optical encoding disc includes a plurality of concentric annular tracks. Each track includes a plurality of coding units. Each coding unit includes a light converging portion and a light diverging portion. The light converging portions and the light diverging portions are arranged alternately along a circumferential direction of the optical encoding disc. The motor is configured for driving the optical encoding disc to rotate. The optical detection system includes a plurality of photo-detectors arranged in a line parallel to a radius of the optical encoding disc. Each photo-detector is corresponding to each track of the optical encoding disc respectively. Each photo-detector is configured for receiving the light beam transmitted through the corresponding track, and generating a voltage according to an intensity of the received light beam.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

Embodiments will now be described in detail below with reference to the drawings.

Figure 1:
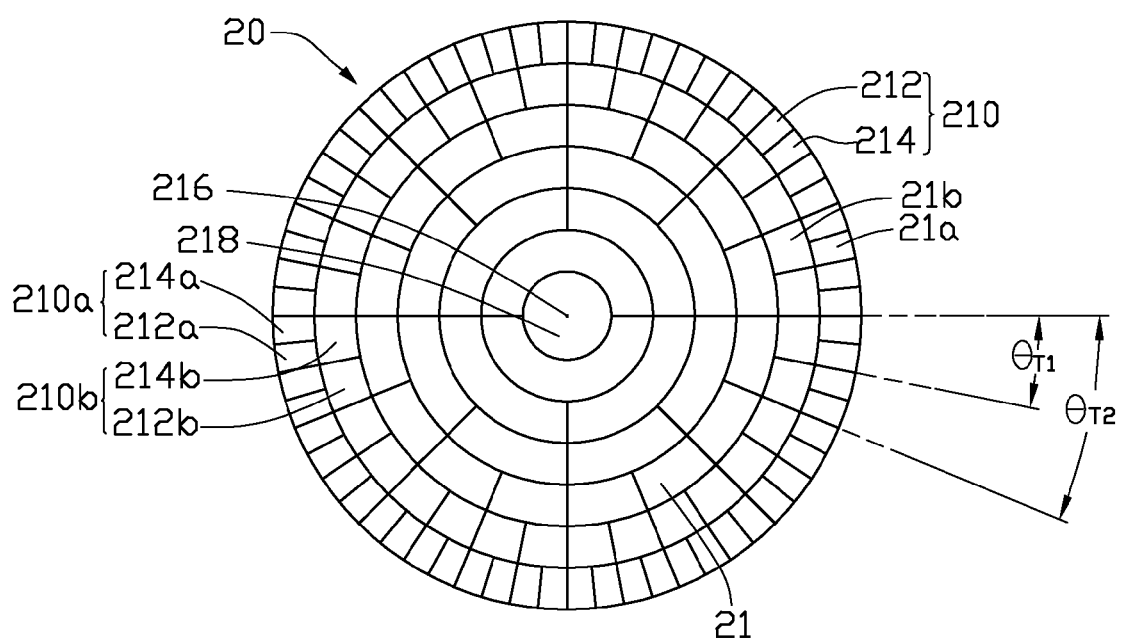
FIG. 1 is a schematic, plan view of an optical encoding disc, according to a first embodiment.

Referring to FIG. 1, an optical encoding disc 20 according to a first embodiment is shown. The optical encoding disc 20 has a through hole 218 defined therein, and includes a plurality of concentric annular tracks 21 surrounding the through hole 218. The tracks 21 are centered at a center 216 of the optical encoding disc 20. In the present embodiment, the total number of the tracks 21 is six. It may be understood that the total number of the tracks 21 depends on the needs of the practical application.

Each track 21 includes a plurality of encoding units 210 periodically arranged along a circumferential direction thereof. Each encoding unit includes a light converging portion 214 and a light diverging portion 212.

Now considering two adjacent tracks: a first track 21a and a second track 21b, the first track 21a is the outmost track, and the second track 21b is adjacent to the first track 21a. The second track 21b is closer to the center 216 of the optical encoding disc 20 than the first track 21a. The first track 21a includes a plurality of encoding units 210a, and each encoding unit 210a includes a light diverging portion 212a and a light converging portion 214a. Likewise, the second track 21b includes a plurality of encoding units 210b, and each encoding unit includes a light diverging portion 212b and a light converging portion 214b.

An angular period of the encoding units 210a on the first track 21a is $\theta_{T1}$. An angular period of the encoding units 210b on the second track 21b is $\theta_{T2}$. The relation between the $\theta_{T1}$ and the $\theta_{T2}$ is: $\theta_{T2}=2*\theta_{T1}$. In the present embodiment, a right edge of the light diverging portion 212a (i.e., an interface between the light diverging portion 212a and the light converging portion 214a) aligns with a middle line of the light converging portion 214b. It is to be understood that the right edge of the light diverging portion 212a may align with a middle line of the light diverging portion 212b.

Figure 2:
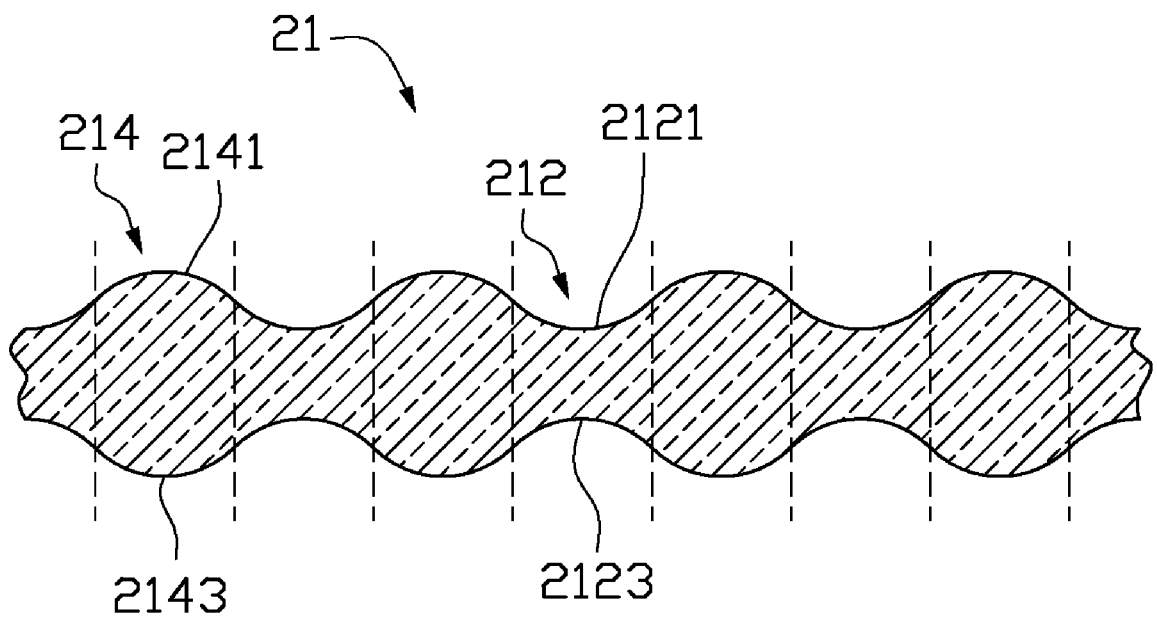
FIG. 2 is a schematic, partially cross-sectional view of a track of the optical encoding disc of FIG. 1, taken along a circumferential direction thereof.

Referring to FIG. 2, the light converging portion 214 includes a first light converging surface 2141 and a second light converging surface 2143. Both of the first light converging surface 2141 and the second light converging surface 2143 are convex surfaces at two opposite sides of the optical encoding disc 20. When light beams emitted from a first side of the light converging portion 214 pass through the light converging portion 214, the light beams form a first light spot with a relatively large light intensity on an opposite second side of the light converging portion 214.

Likewise, the light diverging portion 212 includes a first light diverging surface 2121 and a second light diverging surface 2123. Both of the first light diverging surface 2121 and the second light diverging surface 2123 are concave surfaces at two opposite sides of the optical encoding disc 20. When light beams emitted from a first side of the light diverging portion 212 pass through the light diverging portion 212, the light beams form a second light spot with a relatively small intensity on an opposite second side of the light diverging portion 212. The intensity of the second light spot is less than that of the first light spot.

The first converging surface 2141 and the first diverging surface 2121 cooperatively form a first surface of the track 21. Similarly, the second converging surface 2143 and the second diverging surface 2123 cooperatively form an opposite second surface of the track 21.

The optical encoding disc 20 can be made of glass or light permeable resin. The optical encoding disc 20 can be made by injection molding.

Figure 3:
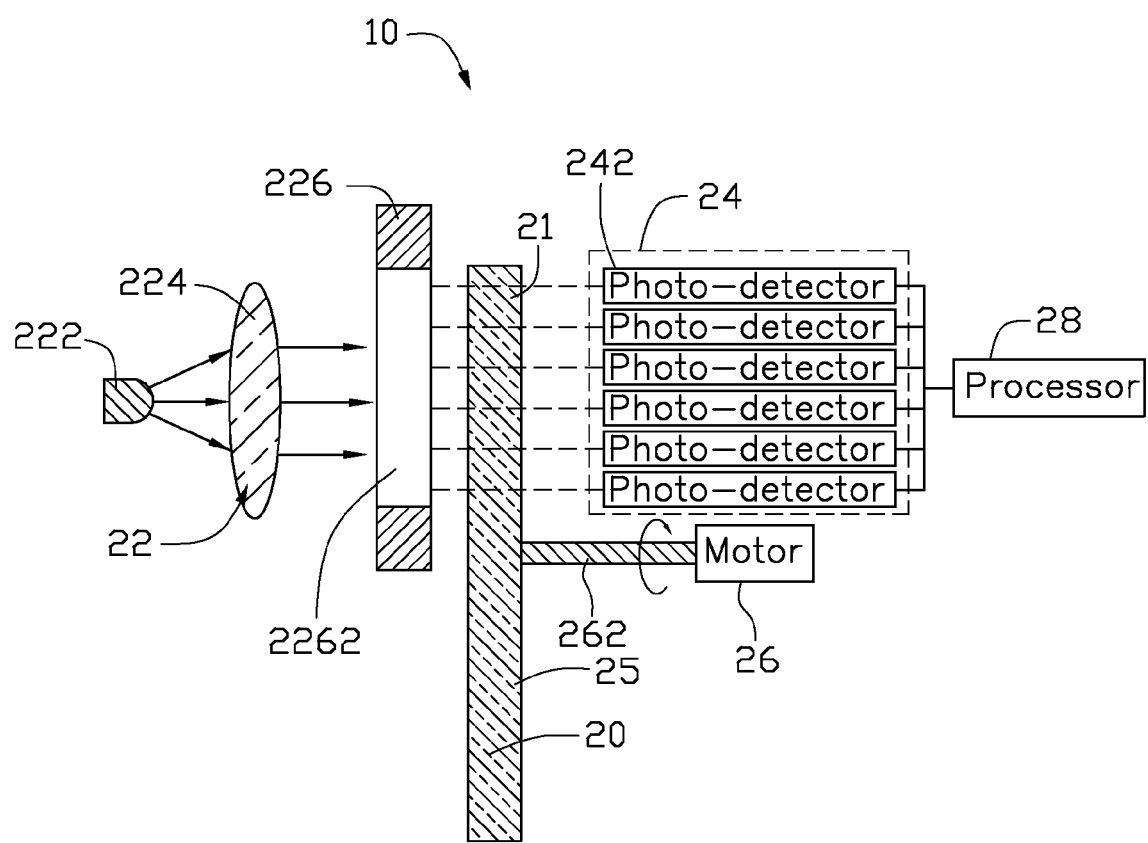
FIG. 3 is a schematic, side view of an optical encoder with the optical encoding disc of FIG. 1.

Referring to FIG. 3, an optical encoder 10 according to an exemplary embodiment includes a light source module 22, the optical encoding disc 20 as shown in FIG. 1, a motor 26, an optical detection system 24, and a processor 28.

The light source module 22 is configured (i.e., structured and arranged) for emitting an elongated light beam towards the optical encoding disc 20. The light source module 22 includes a light source 222, a lens group 224, and a mask plate 226. The light source 222 can be, for example, a light emitting diode (LED). The lens group 224 is configured for attaining parallelism of a light emitting therefrom. In the present embodiment, the optical system is a collimating lens. The mask plate 226 has an aperture 2262 defined therein. The mask plate 226 is configured for changing an incident light beam to an elongated light beam.

The motor 26 includes a shaft 262 extending through the through hole of the optical encoding disc 20. The motor 26 drives the optical encoding disc 20 to rotate.

The optical detection system 24 includes a plurality of independent photo-detectors 242 arranged in a line parallel to a radius of the optical encoding disc 20. Each photo-detector 242 is corresponding to each track 21 of the optical encoding disc 20. Each photo-detector 242 generates a voltage in response to a light intensity of a received light beam. Generally, a magnitude of the voltage is in proportion to the light intensity of the received light beam. That is, the larger the light intensity is, the larger the magnitude of the voltage is.

The processor 28 is electrically connected to the photo-detectors 242. The processor 28 has a predetermined reference voltage. The processor 28 is configured for obtaining a code with respect to an angular position of the optical encoding disc 20, for example, a binary code (described in detail later).

The operation of the optical encoder 10 will be described as below with reference to FIGS. 1-3.

When the optical encoder 10 is activated, the light source 22 emits an elongated light beam towards the optical encoding disc 20. The elongated light beam then impinges upon the tracks 21 of the optical encoding disc 20 at the same time. As the optical encoding disc 20 is rotated to a given angular position by the motor 26, a portion of the elongated light beam falls on a light converging portion 214 or a light diverging portion 212 of each track 21.

Take the first track 21a for example. When a portion of the elongated light beam impinges on a light converging portion 214 of a first track 21a, the portion of the elongated light beam transmits through the light converging portion 214, and forms the first light spot on the photo-detector 242. The photo-detector 242 detects a light intensity of the first light spot, and then generates a first voltage in response to the light intensity of the first light spot. The processor 28, which has a predetermined reference voltage, compares the first voltage with the reference voltage. Because the first voltage is larger than the reference voltage, the processor 28 obtains a value of "1" in response to the light intensity of the first light spot.

Likewise, when a portion of the elongated light beam impinges on a light diverging portion 214 of a first track 21a, the portion of the elongated light beam transmits through the light diverging portion 214, and forms the second light spot ona the photo-detector 242. An intensity of the second light spot is weaker than that of the first light spot. The photo-detector 242 detects the light intensity of the second light spot, and then generates a second voltage in response to the light intensity of the second light spot. The processor 28 compares the second voltage with the reference voltage. Because the second voltage is less than the reference voltage, the processor 28 obtains a value of "0" in response to the light intensity of the second light spot.

Similarly, a plurality of values selected from "0" and "1" associated with other tracks (e.g., a second track 21b) of the optical encoding disc 20 are obtained by the processor 28 simultaneously.

Such values cooperatively form a code (e.g., a binary code) associated with the given angular positions. The code then can be used to determine an angular position of the shaft 262, a rotation speed of the shaft 262, and so on.

The optical encoding disc 20 in accordance with the first embodiment includes a plurality of light converging portions 214 and a plurality of light diverging portions 212 on each track 21 thereof. The optical encoding disc 20 can be formed by injection molding. Therefore, it is simple and low cost to produce the optical encoding disc 20. Accordingly, the cost of the optical encoding disc 20 and the optical encoder 10 is relatively low.

Figure 4:
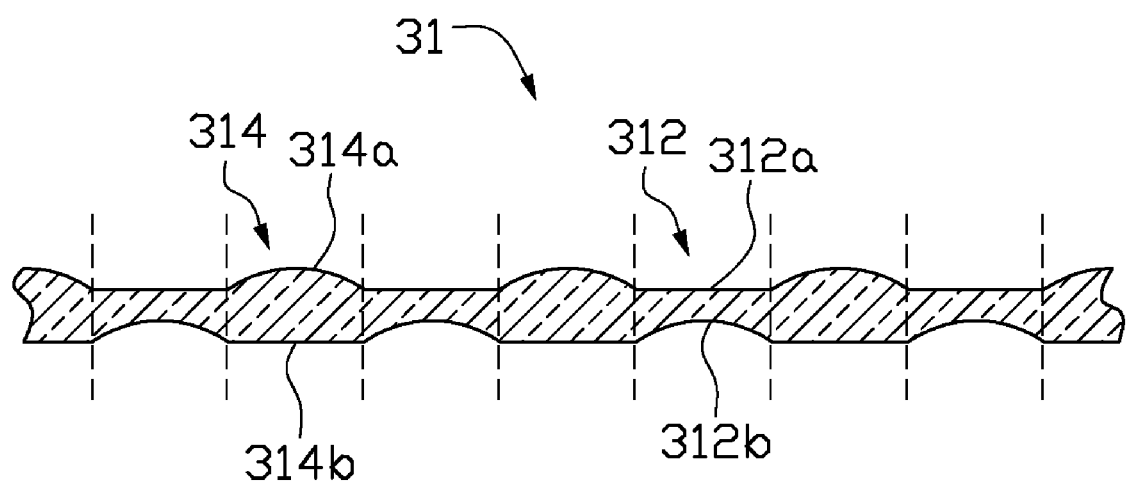
FIG. 4 is a schematic, partially cross-sectional view of a track of an optical encoding disc in accordance with a second embodiment, taken along a circumferential direction thereof.

Referring to FIG. 4, a track 31 of an optical encoding disc according to a second embodiment includes a plurality of light converging portions 314 and a plurality of light diverging portions 312. The light converging portion 314 includes a first convex surface 314a and a second flat surface 314b at two opposite sides of the optical encoding disc. The light diverging portion 312 includes a first flat surface 312a and a second concave surface 312b at two opposite sides of the optical encoding disc.

It is to be understood that surfaces of the light converging portion 314 are not limited to particular shapes, only if the light converging portion 314 achieves a light converging function. It is also to be understood that surfaces of the light diverging portion 314 are not limited to particular shapes, only if the light diverging portion 314 achieves a light diverging function.

While certain embodiments have been described and exemplified above, various other embodiments from the foregoing disclosure will be apparent to those skilled in the art. The present invention is not limited to the particular embodiments described and exemplified but is capable of considerable variation and modification without departure from the scope of the appended claims.

What is claimed is:

1. An optical encoder comprising:
   an optical encoding disc comprising:
   a first annular track comprising a plurality of first coding units periodically arranged along a circumferential direction thereof, an angular period of the first encoding units being $\theta_{T1}$, each first coding unit comprising a first light converging portion and a first light diverging portion, the light converging portions and the light diverging portions being arranged alternately along a circumferential direction of the optical encoding disc; and a second annular track, the first track and the second track being concentric, the second track comprising a plurality of second coding units periodically arranged along a circumferential direction thereof, an angular period of the second encoding units being $\theta_{T2}$, wherein $\theta_{T2}=2*\theta_{T1}$, each second coding unit comprises a second light converging portion and a second light diverging portion, the light converging portions and the light diverging portions being arranged alternately along a circumferential direction of the optical encoding disc an interface between the first light converging portion and the first light diverging portion is aligned with a middle line of the second light converging portion or the second light diverging portion;

a light source module configured for emitting a light beam towards the optical encoding disc;

a motor coupled with the optical encoding disc and configured for driving the optical encoding disc to rotate; and an optical detection system comprising a plurality of photo-detectors arranged in a line parallel to a radius of the optical encoding disc, each photo-detector being corresponding to each track of the optical encoding disc respectively, each photo-detector being configured for receiving the light beam transmitted through the corresponding track, and generating a voltage according to an intensity of the received light beam.

2. The optical encoder as claimed in claim 1, wherein the light source module comprises a light source, a mask plate, and a lens group between the light source and the mask plate.

3. The optical encoder as claimed in claim 2, wherein each first light diverging portion comprises two opposite concave surfaces respectively at two opposite sides of the optical encoding disc.

4. The optical encoder as claimed in claim 2, wherein each first light converging portion comprises a convex surface and an opposite flat surface respectively at two opposite sides of the optical encoding disc.

5. The optical encoder as claimed in claim 2, wherein the first light diverging portion comprises a concave surface and an opposite flat surface respectively at two opposite sides of the optical encoding disc.

6. The optical encoder as claimed in claim 2, wherein each first light converging portion comprises two opposite convex surfaces respectively at two opposite sides of the optical encoding disc.

7. The optical encoder as claimed in claim 1, further comprising a processor electrically connected with each photo-detector, and configured for generating a code associated with an angular position of the optical encoding disc according to the voltage.

8. The optical encoder as claimed in claim 2, wherein the lens group comprises a collimating lens.

9. The optical encoder as claimed in claim 1, wherein the optical encoding disc further comprises a through hole defined in a center thereof, the motor further comprises a shaft, and the shaft extends through the through hole to drive the optical encoding disc to rotate.

* * * * *